UNITED STATES PATENT OFFICE.

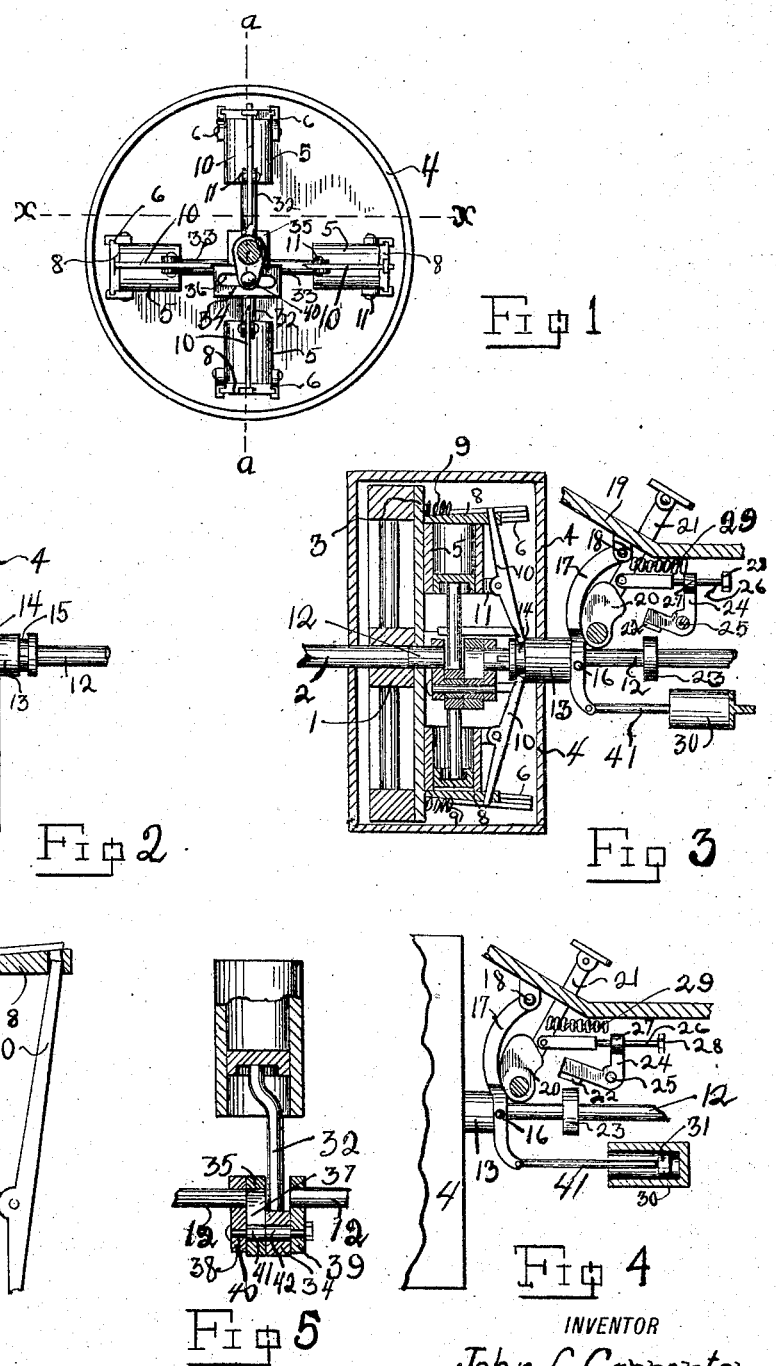

JOHN C. CARPENTER, OF HOUSTON, TEXAS.

CLUTCH AND TRANSMISSION MECHANISM.

947,406.  Specification of Letters Patent.  Patented Jan. 25, 1910.

Application filed March 16, 1909. Serial No. 483,695.

*To all whom it may concern:*

Be it known that I, JOHN C. CARPENTER, a citizen of the United States, residing at Houston, county of Harris, and State of Texas, have invented certain new and useful Improvements in Clutch and Transmission Mechanism, of which the following is a specification.

My invention relates to new and useful improvements in clutch and transmission mechanism, and more particularly to that class of such devices which are fluid controlled.

The accompanying drawing illustrates the application of this device to automobiles.

This invention relates to improvements in means for clutching together two relatively rotatable members, and the object is to provide a connection which will be sufficiently rigid to operate the load and at the same time be sufficiently elastic to prevent any sudden overload from injuring the mechanism. By the introduction of a valve in the fluid space, its free passage may be partially or entirely obstructed. If entirely closed, the whole power of the driving member is delivered to the driven member. If the valve is fully open, the passage of the fluid is unopposed and no power is transmitted from the driving to the driven member. Between these two extremes the power or speed may obviously be varied.

As all ordinary loads may be started and handled on high gear, it will be seen that the shifting of the change speed mechanism may be largely obviated, thus giving to the motor a greater degree of flexibility.

A further feature resides in the provision of means for preventing the clutch from being suddenly engaged, as will be hereinafter accurately set forth and described.

A still further feature of my invention resides in the provision of a mechanism for retarding the revolution of the driven clutch member, when the clutch is disengaged, so that the number of revolutions performed by the driven member may be so reduced as to allow the transmission gears to be shifted without clashing, thus avoiding shock to the mechanism.

Finally, the object of the invention is to provide a device of the character described, that will be strong, durable, light and efficient, and one that will be easily constructed and kept in repair.

With the above and other objects in view, my invention has particular relation to certain novel features of construction and operation, an example of which is given in this specification, and illustrated in the accompanying drawings, wherein—

Figure 1 is an end elevation of my device. Fig. 2 is a side elevation thereof, with the casing broken away. Fig. 3 is a transverse sectional view thereof, taken on the line $a$—$a'$ of Fig. 1, and showing also the operating mechanism in relation to the clutch. Fig. 4 is a detailed view, partially in section, of the operative mechanism of the clutch. Fig. 5 shows a sectional view of a cylinder, and the piston and its connecting mechanism. Fig. 6 is an enlarged sectional view of a cylinder, showing the valve for controlling the port thereof, and the means for operating said valve.

Referring now more particularly to the drawings, wherein like numerals of reference designate similar parts in each of the figures, the numeral 1 refers to the fly wheel of the driving member, which is rigidly mounted on its supporting shaft 2. This fly wheel carries a plate 3 which is made integral with said fly wheel and revolves therewith, and is surrounded by a stationary casing 4, which incloses and protects the operative mechanism of the clutch. Secured to the plate 3 of the fly wheel are a plurality, preferably four, of open-ended cylinders 5. These cylinders are preferably radially disposed and are secured to their supporting plate 3 in any desired manner, preferably by bolts, which pass through flanges carried thereby, and through said plate 3.

The outer end of each cylinder is open and an unrestricted port to atmosphere is provided. The outer end of each cylinder is also provided with two valve-guides 6, adjustably secured to said cylinder, by means of bolts 7, which pass through a slot in said guides and engage with said cylinder. The inner sides of these guides are provided with grooves in which valves 8 slide. These valves are preferably wedge shaped, but the shape thereof may be varied. It is desirable that the grooves of the guides 6 be inclined toward the plane of the open end of the cylinder 5, so that the valve 8 will tightly close the port as the said valve is drawn closed by the action of coil spring 9. This spring is attached to the plate 3 and also to the valve 8 and normally holds said valve in a closed position, and tends to close the same when it is open. The outer end of valve 8 is provided with a slot through which the outer end of valve-shifting lever 10 passes. This lever is fulcrumed on flange 11 carried upon the outer side of the inner end of cylinder 5, and by the manipulation of the inner end of said lever the valve 8 may be opened; or released to the action of spring 9 which closes the same.

The numeral 12 designates the driven member, or shaft, which projects through a bearing in plate 3 and which carries a sliding sleeve 13. This sleeve is concentric with member 12 and carries two annular grooves 14 and 15, one at each end, for the purposes hereinafter stated.

The groove 14, at the inner end of said sleeve, is within the casing and provided for the purpose of receiving the inner or free ends of levers 10, and as the said sleeve is moved back and forth on its supporting member the levers 10 are correspondingly manipulated and the valves opened or closed.

The groove 15, at the outer end of the sleeve 13 and outside the casing, is provided for the purpose of receiving studs or projections 16 carried by the intermediate lever 17. This lever is fulcrumed at the point 18 to the foot board 19 of the machine and extends downwardly therefrom.

The numeral 20 designates a cam, which is carried by manual lever 21. This cam 20 normally rests against the lever 17, which actuates the sleeve 13. Power and motion are communicated from the manual lever 21 to the sleeve 13, through cam 20 and lever 17, in reverse ratio. The motion imparted to sleeve 13 by manual lever 31 increases as the point of contact between cam 20 and lever 17 passes from the heel to the point of cam 20, while the power transmitted to sleeve 13 by manual lever 21 decreases as the point of contact between cam 20 and lever 17 passes from the heel to the point of cam 20, and vice versa. This arrangement of a cam and levers permits greater power to be exerted to slowly unseat the valve, and an increased motion to be given to complete its opening, and permits said valve to be seated more slowly, the motion decreasing as the valve approaches its seat.

The highest point of the cam 20, when valve 8 is fully open, describes the same arc as the curve of the contacting face of the intermediate lever 17, thus allowing the manual lever 21 further movement, when valve is fully open, without affecting the position of said valve; which further movement sets the brake 22. This brake 22 may be of any desired type and is designed to contact with brake wheel 23, carried by the driven member, when set. My preferred form of brake mechanism comprises a brake 22 carried upon a bell crank 24, pivoted to the machine frame at the point 25. The other end of this bell crank is operated by a brake rod 26, which is attached to and operated by manual lever 21. The free end of this rod is, preferably, cylindrical, and slides through a sleeve 27, carried by the bell crank. The sliding movement of said rod through said sleeve may be limited to any desired degree by collar 28 carried on said rod on either side of the sleeve and adjustable on said rod. A spring (not shown) holds said brake normally free from the brake wheel 23.

The manual lever 21, and the cam carried thereby, are normally held withdrawn from contact with the lever 17, by the tension of coil spring 29, which is attached to said manual lever and to the machine frame and when the manual lever is in this position the valves are seated by spring 9.

The numeral 30 designates a dash-pot, which may be of any desired type. This dash-pot preferably comprises a valved cylinder with a piston 31 reciprocating therein, and the piston rod 32 of which has connection with the free end of the lever 17. When the manual lever 21 is disengaged and the tension of springs 9 is fully exerted on valves 8, this dash-pot operates to prevent a sudden engagement of the clutch by reason of the gradually vanishing air cushion in the cylinder behind the piston 31, and the valves 8 are thus gradually seated and the clutch members gradually engaged with each other.

The cylinders carried by the driving member are provided with pistons and piston connecting rods, designated by the numerals 32 and 33. The piston rods 32 are made rigid with an intermediate yoke block 34, and the piston rods 33 are made rigid with a similar yoke block 35. The plane of rotation of one pair of cylinders and their corresponding yoke block is offset from the plane of rotation of the other pair of cylinders, the yoke blocks being side by side and their respective cylinders having their centers in the same plane of rotation with the center of their yoke block. These yoke blocks are each provided with transverse longitudinal slots 36 and 37, the slot 36 being at right angles to the slot 37.

The shaft 12 of the driven member is provided with cranks 38 and 39, in alinement with each other and rigid with the driven shaft. These cranks are connected by a wrist pin 40, which passes through the slots 36 and 37 and is provided with rollers 41 and 42, one for each yoke block, for the purpose of insuring free play of said blocks on said wrist pin. The yoke blocks and their respective pistons and piston rods are integral and form a rigid body, which moves only in two directions, and side thrusts are thus prevented; and the friction and wear of the cylinders are reduced to a minimum.

The operation of my device is as follows:—

When the valves are seated, as shown in Fig. 3, the pistons are held against reciprocating in their respective cylinders and the cranks 41 and 42 and their wrist pin 40 are forced to rotate with the driving member and cause the driven member to rotate with them. But, by a proper manipulation of the manual lever 21, the sliding sleeve 13 is forced forward through the action of cam 20 and intermediate lever 17 and effects the unseating of the valves 8 through the action of levers 10. When the valves are unseated, the pistons are permitted to reciprocate freely in their respective cylinders and the mechanism is declutched, the driving member rotating but communicating no rotation to the driven member. During this free rotation of the driving member the yoke blocks 34 and 35 move back and forth, their lines of movement being at right angles to each other, and the wrist pin 40 sliding in the slots 36 and 37. The operation of cam 20 during the forward movement of lever 21 gives great leverage at the beginning of the declutching action and rapid movement at its close. This forward movement of the manual lever 21 also serves to carry forward the brake rod 26, which slides through the sleeve 27 of bell crank 24 until the clutch is disengaged; and then, by a further forward movement of said manual lever, the collar 28 is brought into engagement with said sleeve 27 and the brake is set on brake wheel 23 immediately after the declutching of the mechanism. Thus the clutch members are disengaged and the brake set on the driven member by a single manipulation of the manual lever. When the manual lever is released, it is pulled back by coil spring 29, the brake is first released by the movement of the rod 26, and the valves are then subjected to the free action of tension springs 9, through the action of which they are seated. A sudden seating thereof is prevented by the dash-pot arrangement as hereinbefore described.

It is obvious that, by the manipulation of the manual lever alone, the speed of the driven member may be varied at will from full stop to full speed.

What I claim is:—

1. In a clutch and transmission mechanism, the combination of a chamber having a fluid port; a movable fluid displacing member acting within said chamber; driving and driven members operatively connected, one with said chamber and the other with said fluid displacing member; a sliding valve for said port; a valve seat; a guide for said valve, said guide being inclined toward said valve seat.

2. In a device of the character described, the combination with two relatively rotatable members; of a chamber carried by one of said members, having a fluid port; means for controlling the flow of fluid through said port; means inclined to the plane of said port for directing the movement of said controlling means; motive means for imparting motion to said controlling means; a movable fluid displacing member acting within said chamber; a manual lever; and means for transmitting motion from said manual lever to said motive means.

3. In a device of the character described, the combination with two relatively rotatable members; of a chamber carried by one of said members, having a fluid port at the outer end thereof; a movable fluid displacing member acting within said chamber; a valve for controlling the flow of fluid through said port; a valve seat; means inclined toward said valve seat for directing the movement of said valve; motive means for imparting motion to said valve; a manual lever; and means for transmitting motion from said manual lever to said motive means.

4. In a device of the character described, the combination with two relatively rotatable members; of a chamber carried by one of said members, having a fluid port at the end thereof; a movable fluid displacing member acting within said chamber; a valve for controlling the flow of fluid through said port; a valve seat; means inclined toward said valve seat for directing the movement of said valve; motive means for imparting motion to said valve; a manual lever; and means for transmitting motion from said manual lever to said motive means.

5. In a device of the character described, the combination with two relatively rotatable members; of a chamber carried by one of said members, having a fluid port at the outer end thereof; a movable fluid displacing member acting within said chamber; a valve for controlling the flow of fluid through said port; a valve seat; means for causing said valve to seat; means inclined toward said valve seat for directing the movement of said valve; motive means for imparting motion to said valve; a manual lever; and means for transmitting motion from said manual lever to said motive means.

6. In a device of the character described, the combination with two relatively rotatable members; of a chamber carried by one of said members, having a fluid port at the end thereof; a movable fluid displacing member acting within said chamber; a valve for controlling the flow of fluid through said port; a valve seat; means for causing said valve to seat; means inclined toward said valve seat for directing the movement of said valve; motive means for imparting motion to said valve; a manual lever; and means for transmitting motion from said manual lever to said motive means.

7. In a clutch and transmission mechanism, the combination with two relatively rotatable members; of a chamber carried by one of said members, having a fluid port; a movable fluid displacing member acting within said chamber; a sliding valve for controlling the flow of fluid through said port; a valve seat; means for causing said valve to seat; means inclined toward said valve seat for directing the movement of said valve; motive means for imparting motion to said valve; a manual lever; and means for transmitting motion from said manual lever to said motive means.

8. In a device of the character described, the combination with two relatively rotatable members; of a chamber, carried by one of said members, having a fluid port; a movable fluid displacing member acting within said chamber; a valve for controlling the flow of fluid through said port; a valve seat; means inclined toward said valve seat for directing the movement of said valve; means constantly tending to close said valve; motive means for opening said valve and for permitting the last mentioned means to close the same; a manual lever; and means for transmitting motion from said manual means to said motive means.

9. In a device of the character described, the combination with two relatively rotatable members; of a chamber, carried by one of said members, having a fluid port; a movable fluid displacing member acting within said chamber; a valve for controlling the flow of fluid through said port; motive means for imparting motion to said valve; a manual lever; means for transmitting motion from said manual lever to said motive means; and means whereby the effect of the movement of the manual lever upon said motive means may be varied at different points in the movement of said manual lever.

10. In a clutch and transmission mechanism, the combination with two relatively rotatable members; of a chamber, carried by one of said members, having a fluid port; a movable fluid displacing member acting within said chamber; a valve for controlling the flow of fluid through said port; a manual lever; means for transmitting motion from said manual lever to said valve; and means whereby the effect of the movement of the manual lever upon said valve may be varied at different points in the movement of said manual lever.

11. In a device of the character described, the combination with a driving and a driven member, operatively connected with each other; of a chamber, carried by one of said members, having a fluid port; a movable fluid displacing member acting within said chamber; a valve for controlling the flow of fluid through said port; motive means for imparting motion to said valve; means for retarding the rotation of said driven member; a manual lever; means for transmitting motion from said manual lever to said motive means; and means whereby the effect of the movement of the manual lever upon said motive means may be varied at different points in the movement of said manual lever, and whereby said retarding means may be operated.

12. In a clutch and transmission mechanism, the combination with a driving and a driven member, operatively connected with each other; of a chamber, carried by one of said members, having a fluid port; a movable fluid displacing member acting within said chamber; means for retarding the rotation of said driven member; a valve for controlling the flow of fluid through said port; a manual lever for transmitting motion to said valve and to said retarding means; and means whereby the effect of the movement of said manual lever upon said valve may be varied at different points in the movement of said manual lever.

13. In a clutch and transmission mechanism, the combination with a driving member and a driven member; of means for effecting engagement between said driving and driven members; means for retarding the rotation of said driven member; a manual lever for controlling said engaging means and said retarding means; and means whereby the effect of the movement of said manual lever upon said engaging means may be varied at different points in the movement of said manual lever.

14. In a clutch and transmission mechanism, the combination with a driving and a driven member, operatively connected with each other; of a chamber carried by one of said members, having a fluid port; a movable fluid-displacing member acting within said chamber; a valve for controlling the flow of fluid through said port; a valve seat; means inclined toward said valve seat for directing the movement of said valve; means constantly tending to close said valve; a manual lever; and means intermediate said valve and said manual lever, including a cam, whereby greater power may be exerted by said manual lever upon said valve at the moment of unseating the same than during any other time, and whereby increasing relative motion may be imparted to said valve during its opening.

In testimony whereof I have signed my name to this specification in the presence of two subscribing witnesses.

JOHN C. CARPENTER.

In the presence of—
Wm. A. Cathey,
Ellsworth Dewey.